A. C. SCHUMAN.
VEHICLE SIGNAL.
APPLICATION FILED FEB. 17, 1921.
1,409,976.
Patented Mar. 21, 1922.
2 SHEETS—SHEET 1.
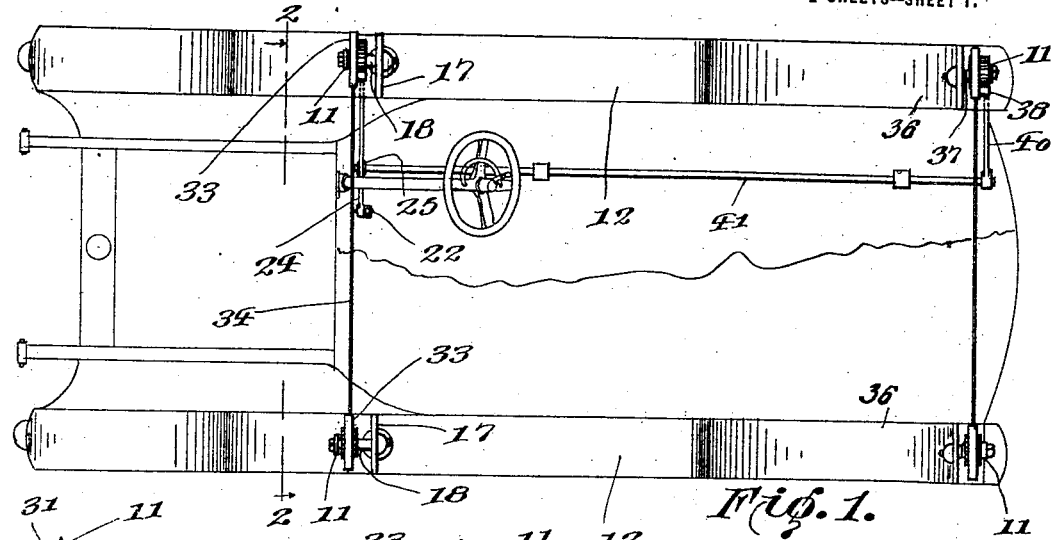
Fig. 1.
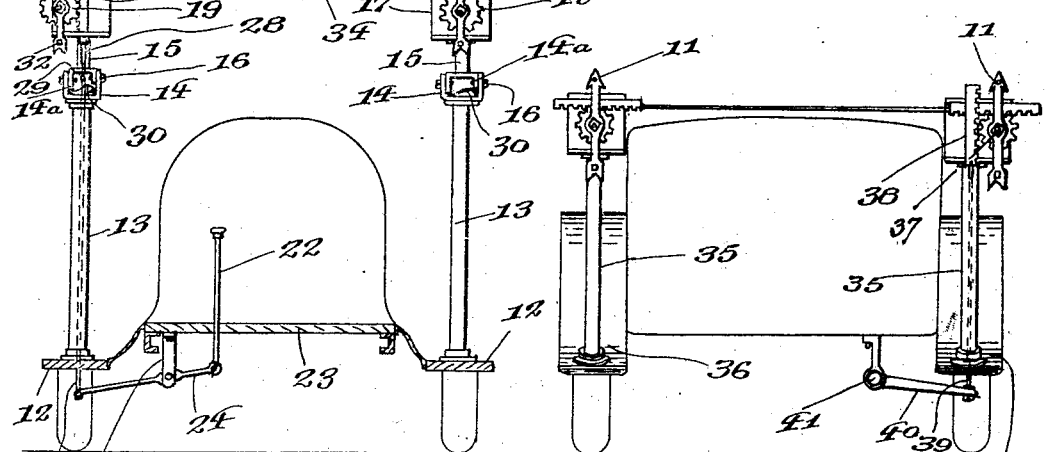
Fig. 2. Fig. 3.
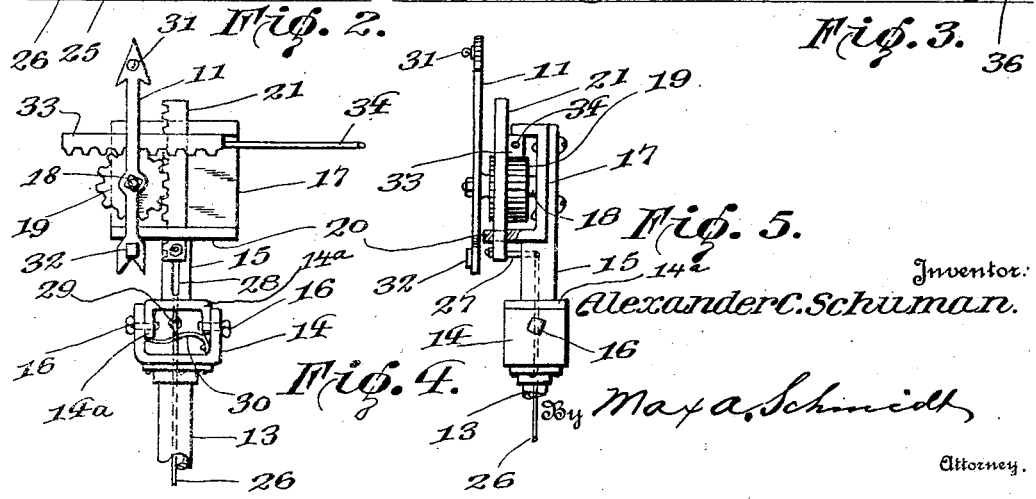
Fig. 5.
Fig. 4.
Inventor:
Alexander C. Schuman.
By Max A. Schmidt
Attorney.

A. C. SCHUMAN.
VEHICLE SIGNAL.
APPLICATION FILED FEB. 17, 1921.
1,409,976.
Patented Mar. 21, 1922.
2 SHEETS—SHEET 2.
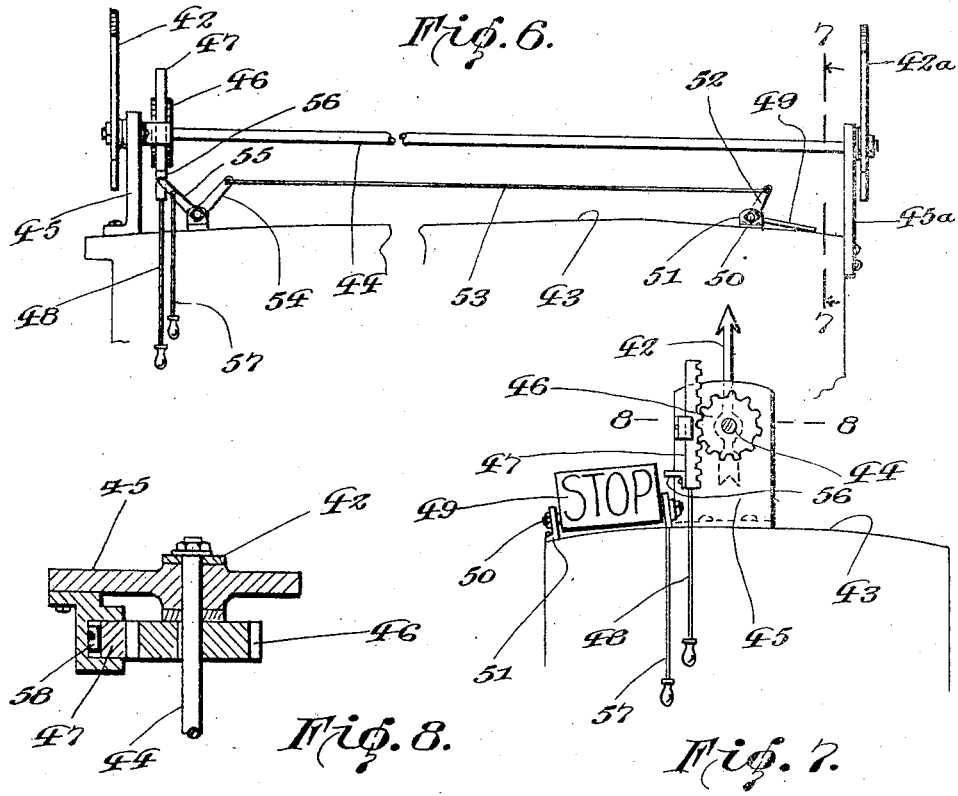
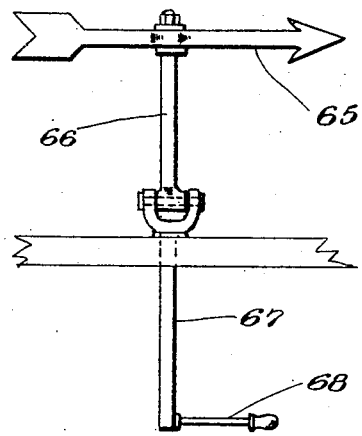
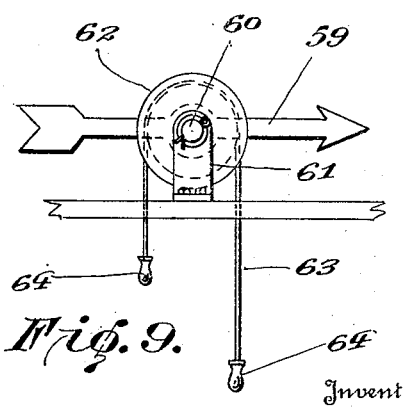
Inventor:
Alexander C. Schuman.
By Max A. Schmidt
Attorney

UNITED STATES PATENT OFFICE.

ALEXANDER C. SCHUMAN, OF LOUISVILLE, KENTUCKY.

VEHICLE SIGNAL.

1,409,976.  Specification of Letters Patent.  Patented Mar. 21, 1922.

Application filed February 17, 1921. Serial No. 445,600.

*To all whom it may concern:*

Be it known that I, ALEXANDER C. SCHUMAN, a citizen of the United States, residing at Louisville, in the county of Jefferson and State of Kentucky, have invented certain new and useful Improvements in Vehicle Signals, of which the following is a specification.

This invention relates to signal devices applicable to automobiles and other vehicles, and designed for indicating a contemplated change in the direction of motion of the vehicle, and also a stop.

The invention has for its object to provide a very simple and efficient indicating or signal device of the kind stated, and to this end it consists in a novel combination and arrangement of parts to be hereinafter described and claimed.

In order that the invention may be better understood, reference is had to the accompanying drawings forming a part of this specification, and in said drawings, Figure 1 is a plan view showing the application of the invention; Fig. 2 is a cross-section on the line 2—2 of Fig. 1; Fig. 3 is an end view showing the signal devices at the rear end of the vehicle; Fig. 4 is an enlarged front elevation of one of the signal units; Fig. 5 is a side elevation thereof; Fig. 6 is an elevation showing another embodiment of the invention; Fig. 7 is a vertical section on the line 7—7 of Fig. 6; Fig. 8 is an enlarged horizontal section on the line 8—8 of Fig. 7, and Figs. 9 and 10 are elevations showing further modifications.

Referring specifically to the drawings, and more particularly to Figs. 1 to 5, the signal device here shown consists of arrow-shaped pointers 11 on each side of the car, one pair being located near the front of the car, and the other pair to the rear of the car. The front pointers are positioned at such a height as to be clearely visible to the traffic behind the car. The supporting means for the two front pointers are alike, and hence a description of one suffices for both.

On the running board 12 of the car is rigidly mounted a tubular standard 13 rising to such a height as to locate the pointer 11 at the desired elevation. To the top of the standard 13 is fastened a fork having its branches 14 extending upwardly, and between these fork branches seat the downturned branches 14ª of a second fork which is at the bottom a short tubular stem 15. The fork branches 14 and 14ª are pivotally connected by pivot screws 16 so that the stem 15 may be swung down to horizontal position from its normal erect position in alinement with the standard 13.

The top of the stem 15 carries a bracket plate 17 which supports a horizontal shaft 18 carrying the pointer 11, and provided with a pinion 19. The shaft 18 extends in the direction of the length of the car, and hence the pointer extends transversely of the car. The bracket plate 17 has a horizontal bottom flange 20 which supports a vertically slidable rack bar 21, which latter is in mesh with the pinion 19. It will therefore be seen that the shaft 18 is rotated when the rack bar 21 is operated. The pointer is normally in erect position, which is the non-display position, and when in display position it extends horizontally and transversely of the car to point in the direction a turn is about to be made.

The rack bar 21 is operated by the driver to set the pointer 11 in display and non-display positions. This is done by means of a vertical push rod 22 passing through the floor 23 of the car, adjacent to the driver's seat, so as to be within each reach. At its lower end, the rod 22 is connected to one end of a rocker 24 suitably supported by a bracket 25 beneath the car floor, and having its other end connected to a pull wire 26 which extends upwardly through the standard 13 and the stem 15 for connection with the rack bar 21, the latter having at its lower end a guide stem 27 which extends into the stem 15 through a slot 28 therein, and to which guide stem the wire is fastened. In order that the wire 26 may not prevent the stem 15 from being swung down to horizontal position as hereinbefore described, it is made in two pieces which are linked together as shown at 29 in line with the pivotal axis of the stem 15.

The purpose of providing the pivoted stem 15 at the top of the standard 13, is to enable the former and the parts carried thereby to be swung downwardly to clear overhead obstructions, as when the car is entering a garage having a low doorway.

The stem 15 is held erect normally by a latch spring 30 carried by one of the fork branches 14 and engaging one of the fork branches 14ª.

The indicator 11 may be provided with a lamp 31, and its rear end may be counterweighted as shown at 32 so that it will automatically resume its erect or non-display position after it is released from display position.

As stated heretofore a pointer 11 is provided for each side of the car, but one operating means can be made to suffice for both by providing a meshing horizontal rack bar 33 for each pinion 19, and connecting said rack bars across by a rod 34. It is the intention to have both indicators 11 point in the same direction so that the driver's intentions are more clearly and prominently displayed.

If it is desired to have the indicators 11 not as high as shown, the folding feature can be eliminated, and it will be understood that the pinion 19 of only one of the pointers is provided with an actuating rack bar 21.

The rear pointers 11 are supported by standards 35 which can be mounted on the rear fenders 36, and as these pointers need not be as high as the front pointers, the folding feature can also be eliminated.

The rear pointers 11 are also connected across for simultaneous operation in the same manner as the front pointers, and the shaft 37 of one of the rear pointers is operated by a similar pinion-and rack device, the rack 38 being operated by a rod or wire 39 connected thereto and to a rocker arm 40 on a shaft 41 which carries the rocker 24, and which shaft extends rearwardly far enough for this purpose.

It will be evident from the foregoing that all four pointers 11 are operated simultaneously to point in the same direction, and hence the driver's intentions are very clearly indicated. If desired the rear pointers may be left off and the front ones only employed; or the car may be equipped with rear pointers only. Various other changes and modifications may also be made without a departure from the scope of the invention as claimed hereinafter.

Figs. 6 and 8 illustrate a direction signal consisting of an arrow-shaped pointer 42 at the front end of the car and a similar pointer 42ª at the rear end of the car. This device is designed for a closed car, it being mounted on the roof 43 thereof. The two pointers are carried by a shaft 44 extending in the direction of the length of the car, and supported by front and rear bearings 45 and 45ª mounted on the car roof 43. Adjacent to the front pointer 42, the shaft 44 has a pinion 46, and the bearing 45 supports a vertically slidable rack bar 47 which is in mesh with said pinion. From the bottom of the rack bar 47 extends an operating rod 48 which passes through the car roof 43 so as to be within easy reach of the driver.

On the roof 43 of the car, at the rear end thereof, is also mounted a "stop" signal comprising a correspondingly inscribed sign plate 49 carried by a rock shaft 50 supported in a bearing 51 on the car roof, and having a projecting rocker arm 52 to which is connected an operating rod 53 extending toward the front end of the car roof and here connected to one arm 54 of an angle-lever suitably supported on the car roof. The other arm 55 of the angle lever is in the path of a projecting lug or pin 56 on the rack bar 47, so that when the latter is drawn down to place the pointers 42 and 42ª in position to indicate that a left turn is to be made, the "stop" signal is also swung into display position, and when the pointers are restored to non-display position, and the lug 56 leaves the lever arm 55, the signal 49 drops by gravity to non-display position. It will therefore be seen that the direction and "stop" signals are operated simultaneously when a left turn is to be made, this being desirable. When the rack bar 47 is pushed up to set the pointers for a right turn, the "stop" signal is not operated, and in order that the "stop" signal may be operated alone, the lever arm 55 is fitted with a pull rod 57 extending through the car roof 43 to a point within easy reach of the driver.

The rear edge of the rack bar 47 is pressed by a spring strip 58 having sufficient tension to hold it stationary in any position in which it may be placed, so that the driver need not hold the operating rod 48 after the rack bar has been slid to place the pointers in non-display or display positions.

The direction and stop indicators may be illuminated in any desired manner so that they may be plainly visible at night.

Fig. 9 shows a pointer 59 which swings from erect non-display position to horizontal display position. This pointer is carried by a shaft 60 supported in a bearing 61 and quipped with a grooved pulley 62 over which is looped a line 63 having handles 64 at its ends. This device is provided with suitable supporting means, the same depending on its location on the car.

Fig. 10 illustrates another embodiment of the invention. Here a pointer 65 is carried at the upper end of a vertical stem 66 which is pivoted at the bottom to the upper end of a vertical shaft 67 having its lower end provided with an operating handle 68. The pointer therefore swings horizontally and when in non-display position it points forwardly or rearwardly, whereas in display position it points sidewise. Any suitable means may be provided for supporting this device, the same depending on its location. The pivotal connection between the stem 66 and the shaft 67 is to permit the former and the pointer 65 to be swung down to clear low places.

I claim:

1. A vehicle direction signal comprising a support having a top section which is normally erect and pivotally supported to fold downwardly, and a pointer carried by said top section, and movable bodily therewith when the same is folded.

2. A vehicle direction signal comprising an upright support having a top section which is pivoted to swing vertically, a horizontal shaft and a vertically slidable rack bar carried by said top section, a pointer and a pinion on the shaft, said pinion being in mesh with the rack bar, and operating means for the rack bar.

3. A vehicle direction signal comprising an upright support having a top section which is pivoted to swing vertically, a horizontal shaft and a vertically slidable rack bar carried by said top section, a pointer and a pinion on the shaft, said pinion being in mesh with the rack bar, and operating means for the rack bar, said operating means being jointed in line with the pivotal axis of the top section.

4. A vehicle direction signal comprising an upright tubular support, a tubular stem pivoted to the top of the standard to swing vertically, a horizontal shaft and a vertically slidable rack bar carried by the stem, a pointer and a pinion on the shaft, the pinion being in mesh with the rack, and an operating rod passing through the support and the stem, and connected to the rack bar, said rod being jointed in line with the pivotal axis of the stem.

5. A vehicle direction signal comprising an upright tubular support, a tubular stem pivoted to the top of the standard to swing vertically, a horizontal shaft and a vertically slidable rack bar carried by the stem, a pointer and a pinion on the shaft, the pinion being in mesh with the rack, and said rack having a guide pin and the stem having a slot into which the guide pin extends, and an operating rod passing through the support and the stem, and connected to the guide pin, said rod being jointed in line with the pivotal axis of the stem.

In testimony whereof I affix my signature.

ALEXANDER C. SCHUMAN.